United States Patent [19]

Raibetanz et al.

[11] 4,168,753
[45] Sep. 25, 1979

[54] TOOL FOR INTRODUCING SELF-TAPPING DOWELS

[75] Inventors: Wilbert Raibetanz, Leinfelden; Karl Seitz, Filderstadt; Karl Wanner, Echterdingen, all of Fed. Rep. of Germany

[73] Assignee: Robert Bosch GmbH, Stuttgart, Fed. Rep. of Germany

[21] Appl. No.: 871,742

[22] Filed: Jan. 23, 1978

[30] Foreign Application Priority Data

Feb. 8, 1977 [DE] Fed. Rep. of Germany ....... 2705082

[51] Int. Cl.² ............................................... E21C 7/02
[52] U.S. Cl. .................................... 175/206; 175/213; 175/218; 173/58; 279/20; 408/58
[58] Field of Search ................. 175/66, 206, 213, 218; 173/58, 80; 279/20; 408/58

[56] References Cited

U.S. PATENT DOCUMENTS

| | | | |
|---|---|---|---|
| 1,112,498 | 10/1914 | Vanes | 91/49 X |
| 2,339,324 | 1/1944 | Fischer | 175/213 X |
| 2,879,035 | 3/1959 | Tilden | 175/213 X |
| 2,918,260 | 12/1959 | Tilden | 175/206 |
| 3,131,947 | 5/1964 | McCarty et al. | 175/213 X |
| 3,638,737 | 2/1972 | Moates | 175/213 X |
| 4,097,176 | 6/1978 | Wanner et al. | 175/213 X |

*Primary Examiner*—Ernest R. Purser
*Assistant Examiner*—Nick A. Nichols, Jr.
*Attorney, Agent, or Firm*—Michael J. Striker

[57] ABSTRACT

A tool for introducing self-tapping dowels in a structure by a drilling process which is accompanied by the generation of large-size drillings, has a shaft connectable with a drive, a dowel holder connectable with the shaft and having a receiving bore which includes a first section adapted to receive a dowel shank and a second section adapted to receive the large-size drillings, and a suction arrangement movable relative to the dowel holder to and from an operative position in which it communicates with the second portion of the dowel holder and draws air therethrough to thereby suck the large-size drillings into the second section of the dowel holder bore wherein they are retained during the drilling process.

21 Claims, 2 Drawing Figures

TOOL FOR INTRODUCING SELF-TAPPING DOWELS

BACKGROUND OF THE INVENTION

The present invention relates to a drilling tool, and more particularly to a tool for introducing a self-tapping dowel into a structure by a drilling process.

It has been proposed in the art to form a blind hole in a shank of a tool, which hole communicates with a suction pipe of a suction device through a swivel. Drillings generated during the drilling process (i.e. comminuted material in form of powder and/or particles of the structure in which a hole is being formed) are sucked from the working zone through the above-mentioned elements so as not to bother an operator and not to contaminate the working area. However, the known device is expensive. It also has the disadvantage that large particles of material generated during the process of drilling can block the swivel and the conduits, and therefore can cause malfunctions.

SUMMARY OF THE INVENTION

Accordingly, it is an object of the present invention to provide a tool for introducing self-tapping dowels, which avoids the disadvantages of the prior art.

More particularly, it is an object of the present invention to provide a tool for introducing self-tapping dowels into a structure wherein small-size drillings generated by the drilling process are continuously and directly drawn by suction means of the tool from a working zone, and at the same time large-size drillings are separated from the small-size drillings and retained in the tool without causing malfunctions.

Another object of the present invention is to provide a tool for introducing self-tapping dowels into a structure which performs the above functions, and at the same time has a simple construction and provides for reliable flow of air to the suction means.

In keeping with these objects, and with others which will become apparent hereinafter, one feature of the present invention resides, briefly stated, in a tool which has a shaft connectable with drive means, a dowel holder extending from the shaft and having a receiving bore which includes a first section adapted to receive a dowel and a second section adapted to receive large-size drillings generated during the drilling process, and suction means movable relative to the dowel holder to and from an operative position in which it communicates with the second section of the dowel holder bore and draws air through the latter to thereby aspirate the large-size drillings in the second section of the bore wherein they are retained during the drilling process.

When a tool for introducing self-tapping dowels is constructed in accordance with the present invention, small-size drillings generated during the drilling process are continuously and directly drawn from the working zone through the tool and evacuated therefrom. The large-size drillings generated during the drilling process, however, are separated from the small-size particles and retained in the second section of the bore of the tool under the action of air sucked through the bore. After termination of the drilling process, the flow of air is interrupted and the large-size particles can be dislodged from the second section of the tool bore, e.g., by shaking and/or tapping the tool. The tool has a simple construction and provides for reliable flow of suction air to the suction means.

Another feature of the present invention is that a suction element of the suction means may be urged by a spring toward an inoperative position in which a recess accommodating the spring communicates with the suction means so that the drillings accumulated in the recess are drawn therefrom by the suction means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
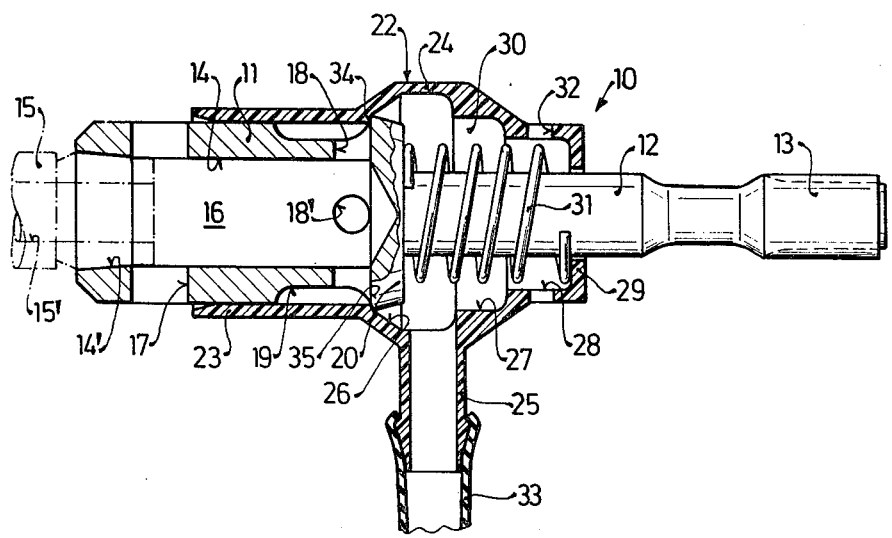
FIG. 1 is a view showing a longitudinal section of a tool for introducing self-tapping dowels in a structure, in an inoperative position.

A tool for introducing a self-tapping dowel into a structure is shown in the drawing and identified by reference numeral 10. The tool has a dowel holding portion 11 and a shaft portion 12 which are formed as an integral member. The portions 11 and 12 may also be constituted by several members which are connected with one another by known means. The shaft portion 12 is provided with engaging formations such as key grooves 13 for connecting the former with a not-shown hammer drill. A blind hole 14 is formed in the holding portion and has a frustoconical section 14' for insertion of a dowel 15 therein. The dowel has a through-going opening 15' communicating with the blind bore 14 of the holding portion 11. Since the end section of the dowel 15 which is received in the blind bore 14 is comparatively short, a substantial section of the blind bore 14 remains free and forms a receiving bore section 16.

Radial bores 17 extend through the walls of the holding portion 11. The radial bores are located adjacent to the conical section 14' of the blind bore 14 and are open into the blind bore 14. An angularly curved tool may be inserted into the radial bores 17 so as to remove the dowel 15 from the frustoconical section 15' by rotation. The radial bores 17 are located at a front end of the holding portion 11.

Radial bores 18, 18' are further formed at a rear end of the holding portion. The bores 18 and 18' extends through the walls of the holding portion 11 and are open into an elongated radial groove 19. The latter is formed in an outer circumferential surface of the holding portion 11. A flange portion 20 is provided in the tool and separates the holding portion 11 and the shaft portion 12 from one another. The elongated radial groove 19 terminates on a front face of the flange portion 20.

A suction element 22 is placed about the tool 10. It may be constituted of an insignificantly yieldable synthetic plastic material, and has a tubular socket 23 which is tightly slidably fitted on an outer surface of the holding portion 11 and extends towards the dowel 15. The suction element 22 further has an intermediate section 24 of an enlarged diameter connected with the socket 23 and provided with a suction socket 25. The suction socket 25 is open into a recess 26 which communicates with two bore sections 27 and 28 of a smaller diameter. In other words, the suction element tapers at the end opposite to the socket 23 in the direction opposite to the latter and has at its end a wall 29 surrounding the shaft 12. The bore sections 26, 27 and 28 of the suction element 22 together form a recess 30 in which a spring 31 is located. A rear end portion of the spring 31 abuts against the wall 29, whereas a front end portion thereof abuts against the flange portion 20 of the tool. Several radial bores 32 extend from the section 28 of the suction element and are outwardly open. A pipe 33 is fitted over the suction socket 25 and leads to a not shown suction means.

The suction element 22 with the socket 23 is movable relative to the holding portion 11 in the direction opposite to the shaft 12. A small shoulder 34 formed at a rear end of the socket 23 can engage with a shoulder 35 formed in a front face of the flange 20.

The tool is shown in FIG. 1 in an inoperative position. In this position the spring 31 urges the suction element 22 to the right so that the shoulder 34 of the suction element 22 abuts against the shoulder 35 of the flange 20. Therefore, the spring cannot further displace the suction element to the right. When the suction means is switched on, air is drawn from outside through the radial bores 32, passes through a recess 30 and the suction socket 25 and enters a not shown container connected with the suction means. If particles of dirt are present in the recess 30 they will be aspirated during the above process.

Figure 2:
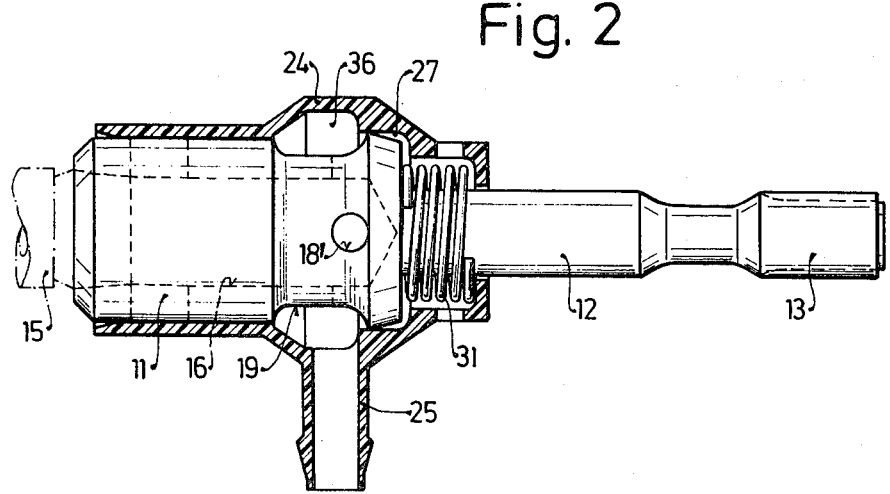
FIG. 2 is a view showing a longitudinal section of the tool illustrated in FIG. 1, but in an operative position.

FIG. 2 shows the tool in an operative position. In this position the holding portion 11 of the tool urges the suction element 22 against the force of the spring 31 to the left until the spring is compressed and the radial bores 17 are closed by the socket 23. Prior to this, the dowel is inserted in the holding portion 11. The diameter of the flange 20 is so dimensioned that the flange 20 circumferentially abuts on an inner surface of the bore section 27 of the suction element 22, whereby communication of the recess 30 with the suction socket 25 is fully interrupted. The enlarged section 24 of the suction element 22 together with the annular groove 19 form an annular recess 36 communicating with the receiving bore section 16 through the radial bores 18 and 18'. Air drawn through the dowel 15 flows through the relatively wide receiving bore 16, the radial bore 18 and the annular recess 36 into the suction socket 25. Small-size particles of material, generated during drilling by the dowel having wedge-shaped blades, are conveyed from the receiving bore portion 16 through the above described elements into the container of the suction means, insofar as they are smaller than the cross-section of the radial bores 18 and 18'.

During the drilling large-size particles of the material are also generated, which have for instance a lenticular shape with a diameter corresponding to the root diameter of the threads of the dowel. These particles may have a diameter exceeding the cross-section of the radial bores 18 so that they cannot pass through the same. These particles are also sucked into the receiving bore section 16 but are retained therein by the flow of air passing through the same. When the process of drilling terminates, the dowel with the hammer drill is withdrawn from a drilled hole. After this, the spring 31 urges the suction element 22 to its inoperative position shown in FIG. 1. The shoulders 34 and 35 again abut against one another whereby the flow of air is terminated, inasmuch as the communication with the suction socket 25 is interrupted. When the hammer drill is now downwardly inclined, the big particles accommodated in the receiving bore section 16 will fall out from the blind bore 14 of the holding portion 11. If after the drilling any particles of material remain in the annular groove 19, they will be moved back into the radial bore 18 by an inclined wall 26 of the recess 24 during movement to the inoperative position. The particles can be shaken off into a container.

In the tool in accordance with the present invention the small-size particles of material are directly drawn from a working zone through the tool during drilling. The large-size particles are drawn into the tool and then poured out from the tool after the drilling process when the hammer drill together with the tool are upwardly inclined and the flow of aspirating air is cut off. In this tool, a proper air supply is always guaranteed. The idle displacement of the suction element 22 is so great that the front radial bores are closed by the same when the tool is moved into the operative position. The idle displacement of the suction element is equal to or smaller than the displacement of the spring. The holes drilled by the tool are cleaned immediately during the drilling (in an upward or downward direction), and not merely after the drilling as in the prior art. Also, during drilling in upward direction with the tool, drillings do not fall on the face of the operator.

It will be understood that each of the elements described above, or two or more together, may also find a useful application in other types of constructions differing from the types described above.

While the invention has been illustrated and described as embodied in a tool for introducing self-tapping dowels, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tool for introducing self-tapping dowels into a structure by a drilling process which is accompanied by the generation of large-size drillings, comprising a shaft having a leading end, and a trailing end connectable with drive means; a dowel holder extending from said leading end of said shaft and having a receiving bore, said receiving bore having a first section adapted to receive a dowel shank therein and a second section adapted to receive the large-size drillings generated during the drilling process; and suction means movable relative to said dowel holder to and from an operative position in which it communicates with said second section of said receiving bore and draws air through the latter to thereby suck the large-size drillings into said second section wherein they are retained during the drilling process.

2. The tool defined in claim 1, wherein said dowel holder has a longitudinal axis and said receiving bore extends in an axial direction of said dowel holder.

3. The tool as defined in claim 1, wherein said first section of said receiving bore is conical, said second section of said receiving bore communicating with said first section thereof.

4. The tool as defined in claim 1, wherein said dowel holder has a wall having a leading section bounding said first bore section, a trailing section bounding said second bore section, and a transition section therebetween, said transition section of said wall of said dowel holder having a through bore extending in a direction transverse to said axis of said dowel holder.

5. The tool defined in claim 1, wherein said suction means includes a suction element surrounding at least portions of said shaft and said dowel holder and movable relative to the same between the operative position in which it communicates said second section of said receiving bore with a source of suction, and an inoperative position in which it interrupts this communication.

6. The tool as defined in claim 5, wherein said suction element is constituted of an insignificantly yieldable synthetic plastic material.

7. The tool defined in claim 5, wherein said suction element has a suction conduit communicating the same with the source of suction.

8. The tool as defined in claim 7, wherein said dowel holder and said suction element together form an annular recess in said operative position, said dowel holder having a wall bounding said second section of said receiving bore, and a through-going hole extending through said wall and communicating said second section of said receiving bore with said annular recess, said annular recess communicating with said suction conduit in said operative position so that a communication is established between said second section of said receiving bore and said source of suction through said through-going hole, annular recess and suction conduit.

9. The tool as defined in claim 8, wherein said dowel holder has a flange portion bounding said annular recess from one axial side thereof, said suction element having an abutment engageable with said flange portion of said dowel holder in said inoperative position so as to interrupt said communication between said annular recess and said suction conduit.

10. The tool as defined in claim 9, wherein said dowel holder has a longitudinal axis, said suction element having a socket extending in an axial direction and surrounding a portion of said dowel holder, said socket having an inner diameter smaller than the diameter of said flange portion of said dowel holder.

11. The tool as defined in claim 8, wherein said suction element is elongated in the axial direction and has end portions spaced from one another in the direction of elongation and a central portion having a transverse dimension exceeding the dimension of said end portion, said suction conduit bounding a suction channel communicating with said central portion of said suction element.

12. A tool as defined in claim 11, wherein said dowel holder has a groove formed in an outer surface thereof and communicating with said through-going hole, said annular recess being formed by an inner wall bounding said groove and by an inner wall bounding said central portion of said suction element.

13. The tool as defined in claim 12, wherein said groove is elongated in the axial direction of said dowel holder.

14. The tool as defined in claim 12, wherein said through-going hole is a radial hole.

15. The tool as defined in claim 14, wherein said dowel holder has at least one additional such radial hole.

16. The tool as defined in claim 7, wherein said suction element together with said shaft form a further recess in said inoperative position; and further comprising spring means located in said further recess and operative for urging said suction element to the inoperative position so that said further recess communicates with said suction conduit.

17. A tool as defined in claim 16, wherein said suction element sealingly embraces the portions of said dowel holder and said shaft and has an opening communicating said further recess with atmosphere.

18. The tool as defined in claim 16, werein said dowel holder has a flange portion connected with said leading end of said shaft, said suction element having a wall spaced from said flange portion in the direction towards said trailing end of said shaft, said spring means including a spring having two axially spaced ends which abut against said flange portion of said dowel holder and said wall of said suction element, respectively.

19. The tool as defined in claim 16, wherein said shaft has a longitudinal axis and said suction element has a section surrounding a portion of said shaft and bounding additional recesses spaced from one another in an axial direction of said shaft, said additional recesses together forming said further recess for accommodating said spring means.

20. The tool as defined in claim 19, wherein said additional recesses are cylindrical.

21. A tool for introducing self-tapping dowels into a structure by a drilling process which is accompanied by the generation of larger-size drillings, comprising a shaft having a leading end, and a trailing end connectable with drive means; a dowel holder extending from said leading end of said shaft and having a receiving bore, said receiving bore having a first section adapted to receive a dowel shank therein and a second portion adapted to receive the large-size drillings generated during the drilling process, said dowel holder having a wall bounding said bore and having a through-going hole extending through said wall in the region of said second section of said bore and communicating with said second section; and suction means including a suction element surrounding said dowel holder and said shaft and having a suction conduit communicating said recess with a source of suction, said suction element being movable relative to said dowel holder between an operative position in which one recess is formed between said suction element and said dowel holder and said one recess communicates with said receiving bore through said through-going hole and draws the large-size drilling into said receiving bore wherein they are retained during the drilling process, and an inoperative position in which another recess is formed between said suction element and said shaft so that the other recess communicates with said suction conduit.

* * * * *